UNITED STATES PATENT OFFICE.

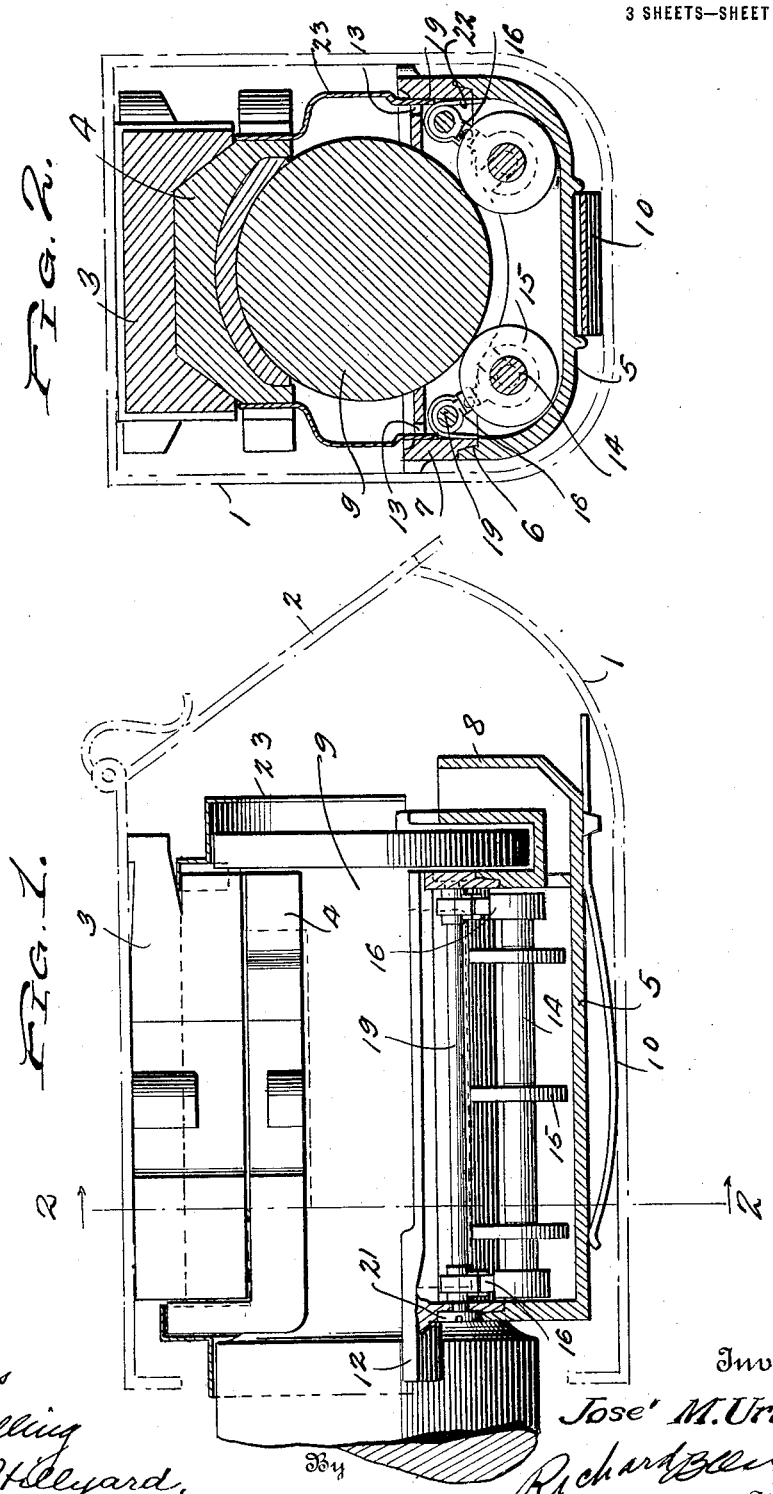

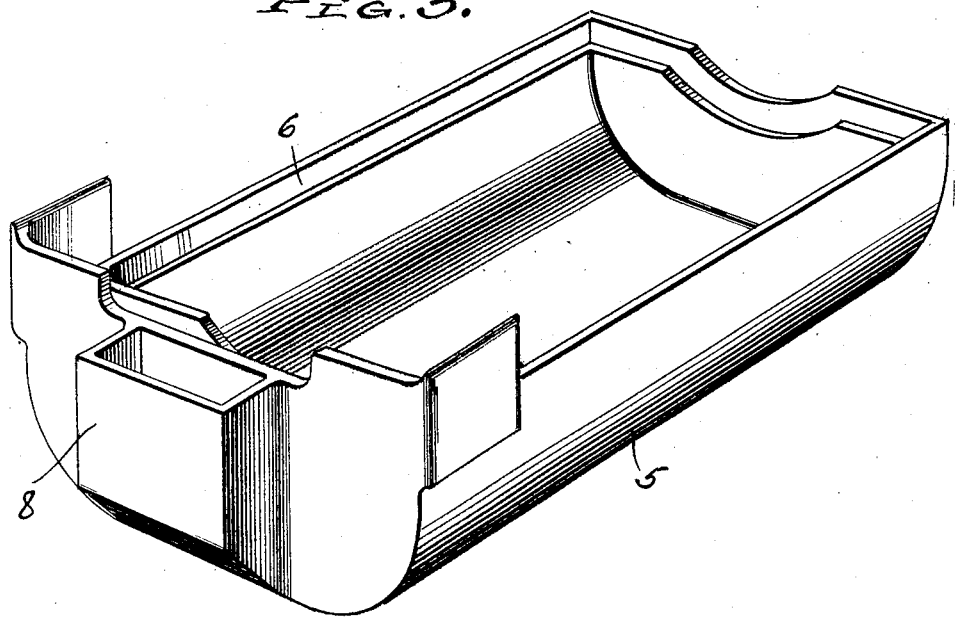
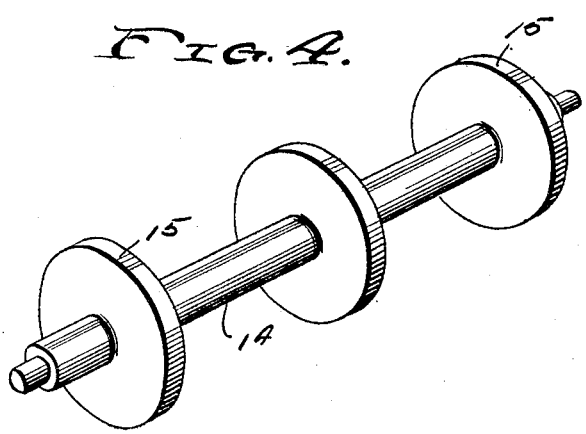

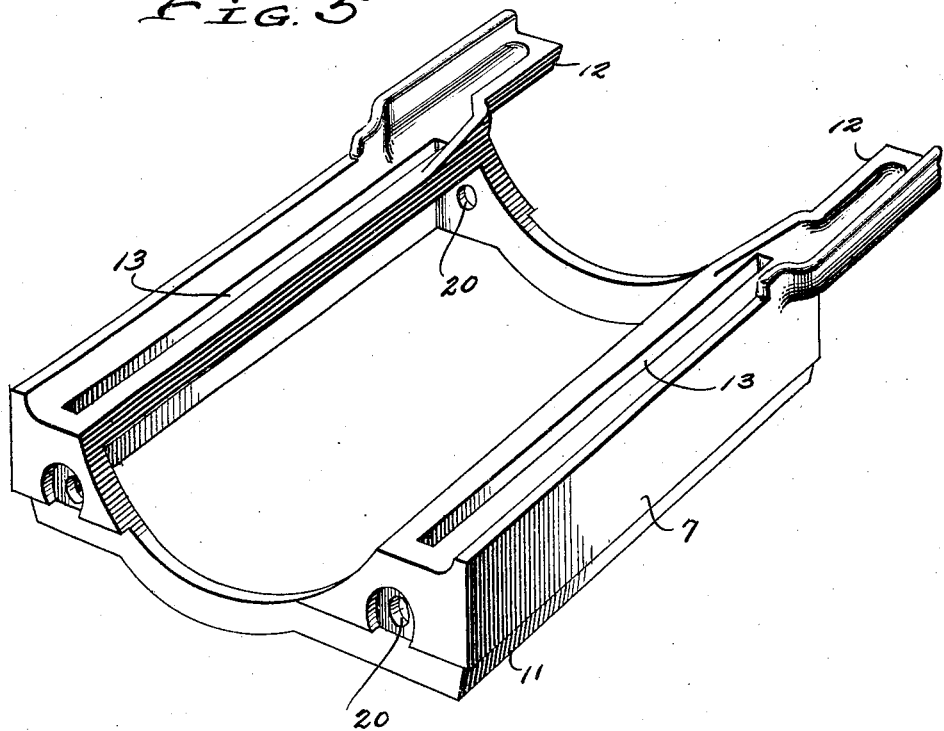
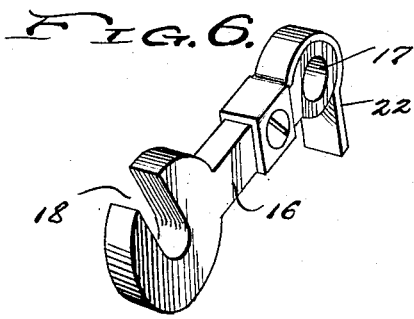

JOSÉ M. URBIETA, OF SAN ANTONIO, TEXAS.

CAR-AXLE LUBRICATOR.

1,325,599.   Specification of Letters Patent.   Patented Dec. 23, 1919.

Application filed March 14, 1919. Serial No. 282,638.

*To all whom it may concern:*

Be it known that I, JOSÉ M. URBIETA, a citizen of Mexico, residing at San Antonio, in the county of Bexar and State of Texas, have invented certain new and useful Improvements in Car-Axle Lubricators, of which the following is a specification.

The invention relates to lubricators designed with special reference for oiling the journals of car axles to prevent the overheating of the journals and bearings.

The invention provides for a positive feed of the lubricant and to prevent any waste of the oil, the latter being contained in a reservoir which is housed in a manner to prevent dust and foreign matter from entering the oil and rendering the same unfit for use as lubricant.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

Referring to the drawings hereto attached,

Figure 1 is a side view partly in section of a car axle lubricator embodying the invention, the dotted lines indicating the journal box.

Fig. 2 is a section on the line 2—2 of Fig. 1 looking to the right as indicated by the arrows.

Fig. 3 is a perspective view of the oil reservoir.

Fig. 4 is a perspective view of one of the roller oil feeders.

Fig. 5 is a perspective view of the roller cage or frame.

Fig. 6 is a perspective view of one of the roller carriers.

Corresponding and like parts are referred to in the following description and indicated in the several views of the drawings.

The journal box 1 is indicated by dotted lines in Figs. 1 and 2 and may be of any well known construction and is provided at its outer end with the usual cover 2 whereby access is readily had to the interior of the journal box for replenishing the same with lubricant and replacing more parts.

The numeral 3 designates a wedge and 4 a brass or bearing. These parts may be of any well known construction and arrangement depending upon the particular type of journal bearing for which the invention is to be adapted.

A reservoir 5 is disposed within the lower portion of the journal box and is adapted to receive the lubricant. The upper edge of the vertical walls of the reservoir are rabbeted, as indicated at 6 and make close connection with the frame or roller cage 7 placed thereon. The outer end of the reservoir 5 is formed with a projection 8 which is hollow and constitutes a filling spout through which lubricant is supplied to the reservoir. The outer end of the reservoir projects vertically some distance to extend upward in front of the journal 9 so as to prevent waste of the oil. The reservoir is supported upon a flat spring 10 which is interposed between the bottom of the reservoir and the bottom of the journal box. The spring 10 is sufficiently stout and presses the reservoir upward to hold the oil feeders in close contact with the lower side of the car axle journal 9.

The frame or cage 7 has the lower edge of its wall rabbeted as indicated at 11 to fit the rabbeted edge 6 of the reservoir 5 to hold the parts in firm relation. The frame 7 comprises longitudinal and end members, the latter being depressed so as to extend beneath the journal 9. The longitudinal members are formed with extensions 12 which project beyond the inner end of the journal 9 so as to catch any lubricant that may be splashed upon the shoulder and convey the same back into the reservoir. The side members of the frame or roller cage 7 are depressed in their upper faces and are slotted, as indicated at 13, to provide an escape for the lubricant. The upper sides of the extensions 12 are depressed and lead into the openings 13 so as to convey any lubricant received thereby back into the reservoir.

The oil feeders consist of two rollers, each comprising a shaft or body 14 and annular flanges 15. The ends of the shaft or body 14 are reduced to form journals which are mounted in carriers 16. The roller oil feeders are carried by the frame 7 and are disposed to operate in the reservoir 5 and are yieldably held in contact with the under side of the journal 9 so as to supply the lubricant thereto. There are two roller oil feeders and each is disposed adjacent a longitudinal or slotted wall of the reservoir.

The roller carriers 16 are of like construction, each consisting of a bar which is enlarged at its opposite ends, one of the enlargements having an opening 17 and the other enlargement being formed with a radial slot 18 which receives a journal of the roller oil feeder. A shaft 19 is supported adjacent each longitudinal member of the frame 7 and is supported in the end walls thereof, said end walls having openings 20 to receive the ends of the shafts which are threaded to receive nuts 21 which are disposed in recesses formed in the outer sides of the end walls as shown most clearly in Fig. 5. The carriers 16 are loosely mounted upon end portions of the shafts 19, the latter passing through the eyes or openings 17 of the carriers. The pivoted end of each of the carriers 16 is provided with a spring 22 which is adapted to engage the side wall of the frame 7 and exert a pressure in a manner to press the roller oil feeders into engagement with the journal 9.

A splash guard 23 preferably of sheet metal extends along the sides and the ends of the journal 9 and serves to catch any lubricant that is thrown from the journal by centrifugal action or otherwise and direct the same back into the reservoir. The splash guard appears as a frame and its side members extend across the space formed between the sides of the brass 4 and the side members of the frame 7, Fig. 2. The outer end of the splash guard extends in front of the journal and its inner end overlaps the shoulder adjacent the inner end of the journal 9. While the splash guard conducts the splash from the journal back into the reservoir it also serves to prevent dust and grit from entering the reservoir or coming in contact with the journal.

When the parts are assembled they appear substantially as indicated in Figs. 1 and 2. The oil is supplied to the reservoir through the outer end of the journal box being poured into the filling spout 8. When the journal 9 is in motion the roller oil feeders are rotated by contact therewith and carry the oil from the reservoir to the journal, said oil spreading over the journal and the excess being removed by the brass or bearing 4. Any of the lubricant extending to the shoulder of the axle at the inner end of the journal is removed therefrom by the splash guard and extensions 12 and directed back into the reservoir. The inner end of the splash guard fits close to the shoulder of the axle to prevent dust and grit entering the journal box. The parts may be placed in position or removed in a manner well understood after first jacking up the journal box to relieve the wedge 3 and brass 4 of the load.

The foregoing description and the drawings have reference to what may be considered the preferred, or approved, form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent is:—

1. In a car axle lubricator, an oil reservoir, a frame mounted thereon and having inner extensions projecting along the shoulder of the axle formed at the inner end of the journal to catch lubricant and direct the same back into the reservoir.

2. In a car axle lubricator, an oil reservoir, a frame mounted upon the reservoir and having inner extensions depressed in their top sides and having the side members of the frame slotted and in communication with the depressions of the extensions to receive waste lubricant and direct the same back into the reservoir.

3. In a car axle lubricator, an oil reservoir disposed beneath the journal of the car axle and a splash guard extending along the sides and ends of the journal to receive the splash and direct the same back into the reservoir.

In testimony whereof I affix my signature in presence of two witnesses.

JOSÉ M. URBIETA.

Witnesses:
Lu McCue,
R. L. Butler.